United States Patent [19]
Stephenson et al.

[11] Patent Number: 5,073,248
[45] Date of Patent: Dec. 17, 1991

[54] ASPHALTENE DISPERSANTS - INHIBITORS

[75] Inventors: William K. Stephenson, Sugarland; Morris Kaplan, Houston, both of Tex.

[73] Assignee: Nalco Chemical Company, Naperville, Ill.

[21] Appl. No.: 655,478

[22] Filed: Feb. 14, 1991

Related U.S. Application Data

[62] Division of Ser. No. 433,885, Nov. 8, 1989, Pat. No. 5,021,498.

[51] Int. Cl.$^5$ .............................................. C08L 33/06
[52] U.S. Cl. ..................................... 208/22; 524/484; 524/65; 524/69; 524/64; 525/134; 525/143; 525/142
[58] Field of Search .................. 524/484, 64; 525/134, 525/143, 142; 208/22

[56] References Cited

U.S. PATENT DOCUMENTS 2,819,237 1/1958 Daniel ................................ 260/29.4

Primary Examiner—Theodore Morris
Assistant Examiner—Mary C. DiNunzio
Attorney, Agent, or Firm—Donald G. Epple

[57] ABSTRACT

A method of dispersing asphalt/asphaltene comprising an admixture of polymer A and polymer B ranging from 90 to 10 weight percent A to from 10 to 90 weight percent B. Wherein polymer A is an alkyl substituted phenolformaldehyde liquid resin having a weight average molecular weight ranging from about 1000 to about 20,000 and an alkyl substituent containing from 4 to 24 carbon atoms, with alkyl substituent may be linear or branched alkyl group. Polymer B is a hydrophilic-lipophilic vinylic polymer.

8 Claims, No Drawings

ASPHALTENE DISPERSANTS - INHIBITORS

This is a continuation application pending from U.S. Ser. No. 07/433,885, filed Nov. 8, 1989, now U.S. Pat. No. 5,021,498.

INTRODUCTION

Asphalts and asphaltenes are normally occurring constituents in crude oils. These materials have been defined as dark brown to black cementitious materials in which the predominating constituents are bitumens that occur in nature or which are obtained in the processing of petroleum and crude oils. These materials characteristically contain very high molecular weight hydrocarbons sometimes referred to as asphaltenes, and are essentially soluble in carbon disulfide, are primarily aromatic in nature, but may also be identified as containing varying amounts of sulfur, oxygen, and nitrogen.

These asphalt and asphaltene components cause varying degrees of difficulties in various processes which are aimed at recovering crude petroleum oils and preparing them for either transportation through pipelines, or in the refining, separation, or other processes required to recover valuable products from crude petroleum oil. In fact, these asphalt and asphaltene components often cause difficulty by precipitating or fouling pumps installed underground for the purpose of recovering these crude oils.

The presence of asphalts and asphaltenes in crude oil and in other fractions of petroleum cause difficulties in the recovery, transportation, and treatment and refining of these crude oils and the various fractions of crude oils in which these asphalts and asphaltenes are contained. As a result, it would be an advance in the art if an asphalt/asphaltene dispersant could be used initially in the recovery of crude oil, and then later in the transportation and refining or treatment of crude oil or crude oil fractions which contain these asphalts and/or asphaltenes. Such asphaltene dispersants are known, but are based on chemically formulated alkyl succinates or on chemically formulated cresylic acids, and modified products containing these materials.

OBJECTS

It is therefore an object of this invention to describe a method of dispersing and maintaining in dispersion certain asphalts and/or asphaltenes in crude oil or crude oil fractions in a way to inhibit or prohibit the precipitation and formation of deposits due to the presence of these asphalts and/or asphaltene components.

It is a further object of this invention to identify a series of polymers which act as asphalt add asphaltene dispersants in crude oil and other hydrocarbon fractions of crude oil.

It is also an object of this invention to identify compositions of certain alkyl substituted phenol-formaldehyde resins which can act as dispersants for asphalts and asphaltenes in crude oil and crude oil fractions containing these asphalts and asphaltenes.

It is also an object of this invention to identify certain hydrophilic-lipophilic vinylic polymers which also act as asphalt and asphaltene dispersants in crude oil and crude oil fractions.

Finally, it is an object of this invention to teach a combination of polymeric products, which combination include alkyl-substituted phenol-formaldehyde resins and hydrophilic-lipophilic vinylic polymers for use as asphalt/asphaltene dispersants and anti-foulants when added in effective amounts to crude oil, petroleum oil, or fractions thereof, in the recovery, transportation, or treatment and refining of these crude petroleum oils and petroleum fractions.

THE INVENTION

We have discovered a method of dispersing and maintaining fluidity of asphalt/asphaltenes fractions in hydrocarbons chosen from the group consisting of petroleum oils, crude oils, and hydrocarbon fractions thereof; which hydrocarbons contain these asphalt and asphaltenes, which method comprises treating the asphalt/asphaltene containing hydrocarbons with an effective asphalt/asphaltene dispersing amount of a liquid polymer chosen from the group consisting of alkyl phenol-formaldehyde resins having a weight-average molecular weight ranging between about 1,000–20,000.

The liquid alkyl phenol-formaldehyde resins are primarily those resins which contain alkyl substituted phenols where the alkyl substituent can range from $C_4$–$C_{16}$ and is chosen from linear and branched alkyl groups.

Preferably, the substituted phenol-formaldehyde resins are those resins which are derived from $C_6$–$C_{12}$ alkyl substituents, which substituents may be linear or branched alkyl substituents and which are attached to a phenol-formaldehyde resin at either the para or ortho positions (or both) of the phenolic ring making up the phenol portion of said resin. Preferably, the weight average molecular weight of these liquid resins ranges between about 2,000 to about 15,000 and most preferably the molecular weight ranges between about 2,500 to about 12,000. These resins may be linear, branched, or even cross-linked, but when branched or cross-linked, the resins must have only sufficient branching or cross-linking so as to remain liquid at temperatures from 0° C.–500° C., or at least able to be suspended stably in inert hydrocarbon solvents.

The most preferred alkyl substituted phenol-formaldehyde resin is a liquid resin derived from an acid catalyzed or base catalyzed reaction of from 1:1.5 to 1.5:1 mole ratio of nonyl phenol and formaldehyde, which liquid resin has a weight average molecular weight ranging between about 2,000 to about 8,000.

The treatment of crude oil or crude petroleum oil, or any hydrocarbon fraction thereof, either during the recovery, transportation, or processing and refining of same, with an effective amount of the above identified alkyl substituted phenol-formaldehyde resins, is to maintain in dispersion in the treated oil phases these asphalt and asphaltenes and prohibit and/or inhibit fouling, precipitation, or the build-up of asphaltic deposits in equipment that is designed for storing, handling, pumping, transporting, or refining these crude oils, petroleum oils, or fractions thereof. This treatment may be achieved at temperatures as low as −10° C. up to temperatures exceeding 500° C., but the usual temperature of treatment is from about 1° C. to 400° C.

As stated earlier, the effective dispersing amounts of these liquid alkyl phenol-formaldehyde resins are those amounts that range between about 1 to about 10,000 ppm of the liquid resin relative to the crude oil, petroleum, or crude oil fraction that is being treated therewith. The preferred range ranges between about 2.5 to about 1,000 ppm, and the most preferred concentrations range between about 5 ppm to about 500 ppm again based on the resin treating the crude oil, petroleum, or petroleum fraction containing the asphalts and/or asphaltenes.

The alkyl phenol is most preferably a $C_8-C_{12}$ alkyl phenol where the alkyl substituent on the phenol ring may be linear or branched, and is most preferably nonyl phenol which is condensed with formaldehyde at approximately a 1:1 mole ratio using either acid or base catalysis, so as to achieve a condensed nonyl phenol-formaldehyde resin which is liquid and has a molecular weight ranging between about 1,000 to about 20,000, preferably between about 2,000 to about 12,000, and most preferably having molecular weight of about 2,000–5,000.

However, we have also discussed other polymers which may also be used to successfully disperse asphalts and asphaltenes in hydrocarbon liquid media, as above, and maintain fluidity of these asphalts and asphaltenes in the hydrocarbons which contain the same. These other polymers are polymers which can be described as hydrophilic-lipophilic vinylic polymers (henceforth H-L V Ps). These H-L V Ps have a weight average molecular weight ranging between about 5,000 to about 250,000, and contain mer units which are repeating and randomly distributed on the polymer backbone, which mer units are derived from the hydrophilic monomers and lipophilic monomers described below.

The lipophilic monomers are primarily those monomers chosen from the group consisting of acrylate or methacrylate fatty esters, i.e. where acrylic or methacrylic acid has been esterified using a fatty alcohol chosen from an alcohol containing from $C_4-C_{24}$ carbon groups, thereby leading to an acrylate or methacrylate ester where the ester functionality contains hydrocarbonaceous substituents including linear and branched alkyl substituents, aromatic, cyclic, alkaryl, aralkyl substituents or mixtures thereof; and where the hydrocarbonaceous groups contain from 4–24 carbon atoms.

Preferably these fatty ester acrylates or methacrylates are those esters which are derived from alcohols containing from 8–16 carbon atoms, and preferably are those alcohols, such as lauryl alcohol and the like. The most preferred lipophilic monomer used to form the hydrophilic-lipophilic vinyl polymers is lauryl acrylate.

These lipophilic monomers are polymerised with a vinylic hydrophilic monomer, which hydrophilic monomer is chosen from acrylic acid or methacrylic acid, and their organic or organic salts, and the non-fatty acrylate or methacrylate esters, where the ester functionality contains a polar unit, such as an alcohol, amine, carboxylic acid, amide, quaternary nitrogen salt, and the like. These hydrophilic vinylic monomers are primarily those monomers chosen from acrylic acid, methacrylic acid, acrylamide, methacrylamide, hydroxyethylacrylate, hydroxypropylacrylate, and the like. The most preferred hydrophilic monomer is hydroxyethylmethacrylate.

This hydrophilic-lipophilic vinyl polymer contains from about 90 weight percent to about 10 weight percent of the lipophilic monomer and about 90 weight percent to about 10 weight percent of the hydrophilic monomer. Preferably, these H-L V Ps contain about 70 weight percent of the lipophilic monomer and 30 weight percent of the hydrophilic monomer. However, these polymers may also contain any ratio of lipophilic monomer to hydrophilic monomer which ranges between about 10:1 to about 1:10.

These H-L V Ps are copolymers which can contain at least one or more of both of the above described hydrophilic and lipophilic monomer units, and are those polymers which can have molecular weights ranging from about 5,000 up to about 250,000, preferably between about 10,000 up to about 150,000, and most preferably are those polymers which have a weight average molecular weight ranging between about 20,000–100,000. The most preferred hydrophilic-lipophilic vinylic polymer which may be used by itself, or in combination with the alkyl phenol-formaldehyde resins described above, are H-L V Ps derived from lauryl acrylate and hydroxyethylmethacrylate, which polymers contain from about 90 to about 30 weight percent lauryl acrylate and from about 10 to about 70 weight percent hydroxyethylmethacrylate. These lauryl acrylate/hydroxyethylmethacrylate H-L V Ps have a molecular weight normally ranging between about 10,000–150,000, and preferably between about 20,000–100,000, and most preferably between about 40,000–80,000. In all cases, where molecular weight is referred to in this application, it is referred to in terms of weight average molecular weight.

Combinations of Polymers

The alkyl phenol-formaldehyde resins and the H-L V Ps described above and later, may be used either alone in treating hydrocarbons which contains asphalts or asphaltenes, or preferably they are used in combination, one with the other. The combination can include from 100 percent alkyl phenol-formaldehyde liquid resin and zero percent hydrophilic-lipophilic vinylic polymer to zero percent alkyl phenol-formaldehyde liquid resin and 100 percent hydrophilic-lipophilic vinylic polymer.

However, it is preferred that the alkyl phenol-formaldehyde liquid resins described above are present between about 10 to about 90 weight percent and the H-L V Ps are present from about 90 to about 100 weight percent in a formulation to be used to treat crude oils, petroleum oils, or hydrocarbon fractions thereof, which contain asphalts and asphaltenes.

It is particularly useful to use as the asphaltene dispersant of this invention, an asphalt/asphaltene dispersant which comprises from 20 to 100 weight percent of an alkyl substituted phenol-formaldehyde liquid resin having about a 1:1 mole ratio of alkyl phenol to formaldehyde and a molecular weight ranging between about 1,000 to about 20,000, and wherein the alkyl substituent is a linear or branched alkyl group containing from five to twelve carbon atoms; and from 80 to 0 weight percent of a hydrophilic-lipophilic vinylic polymer having a molecular weight between 5,000–250,000, and containing from 90 to 10 weight percent of a fatty (meth)acrylate ester and from 10 to 90 weight percent of a hydrophilic monomer chosen from the group consisting of (meth) acrylic acid, (meth) acrylic-acid salts, and (meth) acrylic acid alkoxylate esters.

By the term "fatty (meth)acrylate" we mean either an acrylic acid or a methacrylic acid ester derived from a fatty alcohol containing from four (4) to twenty-four (24) carbon atoms, and preferably from 8–16 carbon atoms and being either linear or branched alkyl alcohols. In general, the term (meth)acrylic(ate) refers to either or both of acrylic acid, or their salts, esters, or the like. (Meth)acrylic acid salts can include alkali metal salts, alkaline earth metal salts, ammonium salts, or salts derived from protonated amines (primary, secondary, or tertiary amines) or from quaternary amines.

The ester of (meth)acrylic acid can also include alkoxylate esters such as hydroxyethyl (meth)acrylate.

The alkoxylate esters are primarily hydrophilic monomers while the alkyl esters are primarily lipophilic monomers, particularly when the alcohol used to esterify the (meth)acrylic acid has at least four carbon atoms.

Preferably the effective method for treating crude oils, petroleum oils, and petroleum or hydrocarbon fractions which contain asphalts and asphaltenes is a method which permits the treatment of these hydrocarbon materials with from about 1.0 up to about 10,000 ppm, based on the hydrocarbon material treated, of any of the asphaltene dispersant formulations of this invention, but the preferred method uses a dispersant formula which contains from 60-95 weight percent of a nonyl phenol-formaldehyde liquid resin, having a molecular weight between about 1,000 to about 12,000, and which dispersant formulation also contains about 40 to about 5 weight percent of a hydrophilic-lipophilic vinylic polymer, which hydrophilic-lipophilic polymer contains from 80-20 weight percent lauryl acrylate and from about 20-80 weight percent hydroxyethylmethacrylate. As before, the preferred molecular weight of this hydrophilic-lipophilic vinylic polymer ranges between about 20,000-100,000, and most preferred molecular weight ranges between about 40,000-80,000.

To exemplify the use of our asphalt/asphaltene antiprecipitants, anti-foulants, and/or dispersants, the following examples are presented.

EXAMPLES

The test procedure for evaluating asphaltene dispersants was developed as follows:

1) 10 ml of hexane is added to a graduated centrifuge tube. To this tube is added the test dispersant. The test dispersant may be added in a diluted form, but is preferably present at dosages (on an active basis) ranging between 1 to about 100 ppm.

2) To the mixture now contained in the centrifuge tube, 100 $\mu$l of an asphaltene stock is added. The stock is formed by dissolving 10 percent, by weight, of either an asphaltic precipitate obtained from a refinery or a precipitated asphaltic residue obtained by treating an asphaltic crude oil (such as an oil obtained from Wyoming) with hexane at a volume ratio of from about 4:1 to about 30:1 hexane:crude, into a heavy aromatic naphtha solvent having a boiling point above 200° C.

3) The centrifuge tubes are then capped and shaken vigorously for about twenty-thirty seconds, or shaken by hand at least fifty times. The centrifuge tubes are set aside and the contents allowed to settle. The volume percent of precipitate is recorded as a function of time, and at a given time, a percent retention value is calculated.

4) When settling of the residue is complete, 1 ml of the top layered supernate is collected, diluted with 3 ml of the same heavy aromatic naphtha used to make up the standard solutions, and the optical density or absorbance of this sample as measured at 475 nanometers by a mini-spec 20 photometer is obtained.

5) Performance is indicated by two parameters: One parameter is the percent retention of asphalt/asphaltenes in the upper phase in a given time, as measured by the volume ratio of asphaltenes to solvent layers; and the other parameter is the percent dispersion as measured by the optical density or absorbance from the upper supernate liquid layer.

6) The percent retention expresses the difference in asphaltene precipitation volume between a sample and the blank, as a percent of the precipitation volume of the blank, i.e., the percent retention equals the precipitate volume of the blank minus the precipitate volume of the treated sample, divided by the precipitate volume of the blank.

7) The percent dispersion value is calculated as the optical density of the sample minus the optical density of the blank divided by the optical density of the reference minus the optical density of the blank, times one hundred.

Using these test procedures and calculations, the data in Tables I, II, III, and IV, present the results obtained when using the alkyl phenol-formaldehyde resins of this invention. These resins are compared to commercial products which are either derived from alkenyl maleic anhydride products, which products are then esterified and formulated as dispersants for asphalts/asphaltenes, or commercial products which are formulated based on cresylic acid modified materials.

TABLE I

Asphaltene Dispersant Test Results[a]

| Sample | Description | Dosage (ppm) | Volume % Precipitate 5 min. | 10 min. | 80 min. | % Retention 80 min. |
|---|---|---|---|---|---|---|
| 1 | Nonyl phenol-formaldehyde resin | 10 | 0.2 | 0.3 | 0.6 | 81 |
| 2 | Commercial product "A" | 10 | 0.3 | 0.5 | 0.8 | 75 |
| 1 | Nonyl phenol-formaldehyde resin | 50 | 0.2 | 0.4 | 0.8 | 75 |
| 2 | Commercial product "A" | 50 | 0.3 | 0.6 | 1.0 | 69 |
| | Blank | — | 1.5 | 2.8 | 3.2 | 0 |

[a]Asphaltenes from a Southern state refinery

TABLE II

Asphaltene Dispersant Test Results[a]

| Sample | Description | Dosage (ppm) | Volume % Precipitate 15 min. | 210 min. | % Retention 210 min. |
|---|---|---|---|---|---|
| 1 | Nonyl phenol-formaldehyde resin | 5 | 0.5 | 1.1 | 74 |
| 2 | Commercial product "A" | 5 | 0.8 | 0.9 | 79 |
| 1 | Nonyl phenol-formaldehyde resin | 50 | 0.5 | 0.9 | 79 |
| 2 | Commercial product "A" | 50 | 0.5 | 1.1 | 74 |
| 3 | Aromatic naphtha | 50 | 1.1 | 3.0 | 29 |
| | Blank | — | 3.0 | 4.2 | 0 |

[a]Asphaltenes from a Southern state refinery

TABLE III

Asphaltene Dispersant Test Results[a]

| Sample | Description | Dosage (ppm) | Volume % Precipitate 8 min. | Volume % Precipitate 80 min. | Volume % Precipitate 18 hrs. | % Retention[b] 18 hrs. | % Dispersion[c] 18 hrs. |
|---|---|---|---|---|---|---|---|
| 1 | Nonyl phenol-formaldehyde resin | 5 | 0.2 | 0.5 | 1.5 | 62 | 40 |
| 2 | Commercial product "A"[d] | 5 | 0.2 | 0.6 | 1.5 | 62 | 38 |
| 3 | Aromatic naphtha | 5 | 1.8 | 3.0 | 3.0 | 25 | 17 |
| 4 | Commercial product "B"[e] | 5 | 0.3 | 2.3 | 3.5 | 22 | 24 |
| 5 | Commercial product "C"[f] | 5 | 1.0 | 4.2 | 4.0 | 0 | 8 |
|  | Blank[g] | — | 3.2 | 4.2 | 4.0 | 0 | 0 |
|  | Reference[h] | — | — | — | — | — | 100 |

[a] Asphaltenes hexane extracted from Wyoming crude oil
[b] Based on amount of precipitate
[c] Based on optical density of hexane phase
[d] Alkenyl-maleic anyhydride/esterified based product
[e] Cresylic acid based product
[f] Cresylic acid based product
[g] Hexane & asphaltene*
[h] Aromatic solvent & asphaltene*

*Hexane addition to petroleum fractions tends to precipitate asphalts/asphaltenes from these fractions, therefore no retention, or very little retention is observed. Normally, aromatic solvents do not have this effect and therefore retention is very high, or complete.

TABLE IV

Asphaltene Dispersant Test Results[a]
Alkyl phenol-Formaldehyde Resin Series

| Sample | Phenol-Alkyl Groups | Resin MW | PPM | % Dispersion |
|---|---|---|---|---|
| 1 | nonyl | 2,300 | 10 | 36 |
| 2 | nonyl | 4,500 | 10 | 51 |
| 3 | t-amyl | 3,300 | 10 | 23 |
| 4 | nonyl/butyl | 1,400 | 10 | 26 |
| 5 | nonyl/dinonyl | 2,000 | 10 | 33 |
| 6 | nonyl/dinonyl | 3,500 | 10 | 40 |
| 1 | nonyl | 2,300 | 40 | 40 |
| 2 | nonyl | 4,500 | 40 | 47 |
| 3 | t-amyl | 3,300 | 40 | 37 |
| 4 | nonyl/butyl | 1,400 | 40 | 29 |
| 5 | nonyl/dinonyl | 2,000 | 40 | 37 |
| 6 | nonyl/dinonyl | 3,500 | 40 | 35 |
|  | blank | — |  | 0 |

[a] Asphaltenes from a refinery in a northern winter state (U.S.)

TABLE V

Vinyl Polymers Laboratory Asphaltene Test Results / Vinyl Polymer Description

| Polymer | Dosage (ppm) | Retention (in %) | Code | Monomers | Weight % | Mole % | Molecular Weight |
|---|---|---|---|---|---|---|---|
| 1 | 5 | 10 | a | Acrylic Acid | 5.2 | 9.0 | — |
|  | 50 | 5 | a | Butyl Acrylate | 81.7 | 79.3 |  |
|  |  |  |  | Dimethylamino ethyl methacrylate | 10.1 | 8.0 |  |
|  |  |  |  | Methyl Methacrylate | 3.0 | 3.7 |  |
| 2 | 100 | 89 | a | Butyl acrylate | 75.0 | 75.3 | 27,000 |
|  |  |  |  | Hydroxyethyl acrylate | 19.8 | 21.9 |  |
|  |  |  |  | Lauryl acrylate | 5.2 | 2.8 |  |
| 3 | 10 | 79 | a | Butyl acrylate | 37.3 | 46.0 | — |
|  | 5 | 91 | a | Hydroxyethyl methacrylate | 23.0 | 27.9 |  |
|  | 50 | 88 | a | Lauryl acrylate | 39.7 | 26.1 |  |
|  | 100 | 88 | a |  |  |  |  |
|  | 100 | 93 | a |  |  |  |  |
| 4 | 100 | 30 | a | Butyl acrylate | 95.0 | 95.1 | — |
|  |  |  |  | Hydroxyethyl methacrylate | 5.0 | 4.9 |  |
| 5 | 100 | 71 | a | Butyl acrylate | 84.4 | 84.5 | 15,500 |
|  |  |  |  | Dimethylamiro ethyl methacrylate | 8.4 | 7.5 |  |
|  |  |  |  | Hydroxyethyl acrylate | 7.2 | 8.0 |  |
| 6 | 100 | 30 | a | Butyl acrylate | 85.2 | 83.3 | — |
|  |  |  |  | Vinyl pyrpolidone | 14.8 | 16.7 |  |
| 7 | 10 | 33 | a | Butyl acrylate | 24.9 | 22.3 | 97,000 |
|  | 100 | 62 | a | Vinyl pyrpolidone | 75.1 | 77.7 |  |
| 8 | 100 | 23 | a | Butyl acrylate | 79.8 | 82.0 | — |
|  |  |  |  | Vinyl trimethoxysilane | 20.2 | 18.0 |  |
| 9 | 1 | 33 | a | Dimethylamino ethyl methacrylate | 27.2 | 34.8 | — |
|  | 5 | 58 | a | Hydroxyethyl methacrylate | 23.2 | 35.8 |  |
|  | 25 | 74 | a | Stearyl methacrylate | 49.6 | 29.4 |  |
| 10 | 10 | 84 | a | Hydroxyethyl acrylate | 11.2 | 20.7 | — |
|  | 20 | 82 | a | Lauryl acrylate | 88.8 | 79.3 |  |
|  | 10 | 82 | a |  |  |  |  |
|  | 5 | 91 | a |  |  |  |  |
|  | 10 | 94 | a |  |  |  |  |
|  | 100 | 88 | a |  |  |  |  |
|  | 100 | 90 | a |  |  |  |  |
|  | 5 | 54 | a |  |  |  |  |
|  | 50 | 60 | a |  |  |  |  |
| 11 | 20 | 82 | a | Hydroxyethyl methacrylate | 11.8 | 19.9 | — |
|  |  |  |  | Lauryl acrylate | 88.2 | 80.1 |  |
| 12 | 5 | 67 | a | Hydroxyethyl methacrylate | 11.9 | 20.0 | — |

TABLE V-continued

| | Vinyl Polymers Laboratory Asphaltene Test Results | | | Vinyl Polymer Description | | | |
|---|---|---|---|---|---|---|---|
| Polymer | Dosage (ppm) | Retention (in %) | Code | Monomers | Weight % | Mole % | Molecular Weight |
| | 5 | 71 | a | Lauryl acrylate | 88.2 | 80.1 | |
| | 10 | 84 | a | | | | |
| | 3 | 58 | a | | | | |
| | 30 | 62 | a | | | | |
| | 3 | 95 | a | | | | |
| | 30 | 88 | a | | | | |
| 13 | 3 | 93 | a | Hydroxyethyl methacrylate | 17.7 | 28.4 | — |
| | 30 | 85 | a | Lauryl acrylate | 82.3 | 71.6 | |
| 14 | 3 | 76 | a | Hydroxyethyl methacrylate | 28.4 | 42.3 | — |
| | 30 | 76 | a | Lauryl acrylate | 71.6 | 57.7 | |
| 15 | 3 | 95 | a | Hydroxyethyl methacrylate | 39.0 | 54.2 | 42,000 |
| | 30 | 85 | a | Lauryl acrylate | 61.0 | 45.8 | |
| 16 | 3 | 95 | a | Hydroxyethyl methacrylate | 49.8 | 64.7 | — |
| | 30 | 85 | a | Lauryl acrylate | 50.2 | 35.3 | |
| 17 | 3 | 98 | a | Hydroxyethyl methacrylate | 56.0 | 70.2 | — |
| | 30 | 85 | a | Lauryl acrylate | 44.0 | 29.8 | |
| 18 | 2 | 74 | b | Hydroxyethyl methacrylate | 39.0 | 54.1 | 40,000 |
| | 5 | 70 | b | Lauryl acrylate | 61.0 | 45.9 | |
| | 80 | 56 | b | | | | |
| | 1 | 25 | c | | | | |
| | 5 | 29 | c | | | | |
| | 50 | 39 | c | | | | |
| | 5 | 13 | d | | | | |
| | 50 | 62 | d | | | | |
| | 3 | 50 | c | | | | |
| | 30 | 87 | d | | | | |
| 19 | 2 | 82 | b | Hydroxyethyl methacrylate | 30.1 | 44.3 | |
| | 20 | 78 | b | Lauryl acrylate | 69.9 | 55.7 | |
| 20 | 2 | 78 | b | Hydroxyethyl methacrylate | 30.0 | 44.2 | |
| | | | | Lauryl acrylate | 70.0 | 55.8 | |
| 21 | 5 | 11 | a | Lauryl acrylate | 70.0 | 52.0 | |
| | 50 | 0 | a | Vinyl pyrpolidone | 30.0 | 48.0 | |

CODE EXPLANATION.
a Asphaltene residue taken from a Southern state (U.S.) refinery
b Hexane extracted asphaltenes from Wyoming crude oil #1
c Hexane extracted asphaltenes from Wyoming crude oil #2
d Hexane extracted asphaltenes from California crude oil

TABLE VI

Liquid Resin - Vinyl Polymer Blends

| Blend | Description | Weight % | Dosage (ppm) | Retention (in %) | Code |
|---|---|---|---|---|---|
| 1 | Butylphenol-formaldehyde resin | 50 | 5 | 66 | a |
| | Polymer #12 | | | | |
| 2 | Nonylphenol-formaldehyde resin | 58 | 3 | 78 | a |
| | Polymer #12 | 42 | 30 | 76 | a |
| 3 | Nonylphenol-formaldehyde resin | 25 | 2 | 60 | b |
| | Polymer #18 | 75 | 5 | 70 | b |
| | | | 50 | 66 | b |
| 4 | Nonylphenol-formaldehyde resin | 50 | 2 | 56 | b |
| | Polymer #18 | 50 | 5 | 64 | b |
| | | | 50 | 64 | b |
| 5 | Nonylphenol-formaldehyde resin | 75 | 2 | 60 | b |
| | Polymer #18 | 25 | 5 | 60 | b |
| | | | 50 | 62 | b |
| 6 | Nonylphenol-formaldehyde resin | 25 | 1 | 36 | c |
| | Polymer #18 | 75 | 5 | 50 | c |
| | | | 50 | 46 | c |
| 7 | Nonylphenol-formaldehyde resin | 50 | 1 | 32 | c |
| | Polymer #18 | 50 | 5 | 21 | c |
| | | | 50 | 29 | c |
| 8 | Nonylphenol-formaldehyde resin | 75 | 1 | 29 | c |
| | Polymer #18 | 25 | 5 | 46 | c |
| | | | 50 | 32 | c |
| 9 | Nonylphenol-formaldehyde resin | 75 | 2 | 78 | b |
| | Polymer #21 | 25 | | | |

CODE EXPLANATION:
a Asphaltene residue taken from a Southern state (U.S.) refinery
b Hexane extracted asphaltenes from Wyoming crude oil #1
c Hexane extracted asphaltenes from Wyoming crude oil #2
d Hexane extracted asphaltenes from California crude oil The nonyl phenol-formaldehyde resins used in Tables I and II are those resins having a molecular weight ranging between about 2,000 and about 6,000, and are The commercial product "A" is a commercial product based upon alkenyl-maleic anhydride adducts which are then esterified with mono or polyhydric aliphatic alcohols.

In all Tables, the asphaltenes are derived from refinery asphaltenes or crude oil extractions and are used as indicated in the above test procedures. In Table III, commercial product "B" and commercial product "C", are both products derived from cresylic acid modified materials.

In Table IV, various alkyl phenol-formaldehyde resins have been synthesised with various molecular weights and tested as asphalt/asphaltene dispersants. The asphaltenes tested in Table IV come directly from a refinery located in a northern winter state of the United States.

In addition to the tests listed above, a product was formulated which contained 75 weight percent of the preferred nonyl-phenol product and 25 weight percent of the preferred hydrophilic-lipophilic vinylic polymer. In this case, the hydrophilic-lipophilic vinylic polymer contained 70 weight percent lauryl acrylate and 30 weight percent hydroxyethylmethacrylate.

This 75:25 weight ratio of nonyl phenol-formaldehyde resin and H-L V Ps were dissolved in an inert aromatic naphthinic hydrocarbon solvent so that the asphaltic dispersant solution contained 25 weight percent total polymeric solids. This solution was along with an emulsion breaker additive was added to the annulus of a crude oil well recovering crude oils which were fed to a heater treater used to resolve hydrocarbon and aqueous phases therefrom. This operation continued to operate within specification indicating that the use of this asphaltic dispersant formula did not interfere with the emulsion breaker formulas being used simultaneously.

At another location resolved crude oil from a heater treater was stored in a crude oil stock tank, which had, over a period of time, collected precipitated asphalt and asphaltenes in the bottom of this 500 barrel (about 27,500 gallon) tank, so that approximately 8-10 inches at the bottom of the tank contained a hard asphalt/asphaltene deposit which was no longer suspended in the oil fraction. Ten gallons of the 25% active polymer formulation dissolved in ten drums of oil were then circulated through the tank which contained the hardened asphaltic and asphaltene residues. Tank contents were "rolled", through a hot oiling truck at a temperature of about 180° F. for a period of about two to six hours. Visual inspection indicated that all of the asphaltic bottoms and asphaltenes had been removed, dispersed in the treated oil, and that such results were far superior to a typical tank "roll" which was used to attempt to remove asphaltenes by simply "rolling" the tank with ten drums of untreated oil.

Finally, at another well head, performance was inadequate and erratic primarily due to periodic recycling of poorly resolved crude oil (demonstrated to contain high concentrations of asphalts/asphaltenes) from the stock tank into the treater. In spite of adding emulsion-breaking chemicals and other commercial solids (sands, clays, muds, etc.) dispersants to the treater at rates ranging between about 5 to 6 quarts a day, calculating to about 150 to about 200 ppm active ingredients in the recovered crude oil, operation at this site was unacceptable.

The standard solids control additive, a commercial product based on non-ionic ethoxylate polymers and a fatty acid amide, was replaced with ten gallons of a 25 percent active polymer solids formulation containing the 75:25 weight ratio of the preferred nonyl phenol-formaldehyde resin and preferred hydrophilic-lipophilic vinylic polymer described above. About ten gallons of this formulation was fed into the treater on a single day. Although no noticeable positive change was observed within about the first 24-36 hours, the treater interface, which was ragged and had been clumping, and which contained large concentrations of asphalts and asphaltenes, shortly thereafter had a smooth texture and the asphalt/asphaltenes had been dispersed in such a way that a smooth, acceptable oil was obtained from the treater for transfer to the pipeline company. This oil was collected, sampled, analysed, and accepted for transport by the pipeline company. Continuous addition of the preferred polymer to the treater at 4-6 quarts per day was then required to maintain normal treater performance.

In addition, visual inspection of the 27,500 gallon storage tank indicated that by treating the treater with the formulation above, and circulating the contents of the treater through the storage tank at temperatures ranging between about ambient temperatures (35° F.) to about 130° F., most of the asphaltene precipitate in the stock tanks had been dispersed, and could be sent through the heater treater to recover a hydrocarbon phase which was acceptable for transport by the pipeline company.

Again the use of the preferred formulations of these inventions easily distributed and dispersed hardened asphaltene and asphaltic residues into hydrocarbon oils and maintained these asphaltic/asphaltene residues in dispersion in these oils, so that this dispersed asphaltene hydrocarbon could be easily transported and processed by refining or other processing steps.

Tables V and VI describe the use of various H-L V Ps (Table V) alone for asphalt/asphaltene dispersions and various combinations of the liquid resins (from nonyl phenol-formaldehyde condensates) and H-L V Ps. As can be seen, the H-L V Ps can be used alone and also in the preferred combination of liquid resins and H-L V Ps.

Having described our invention we claim:

1. A method of dispersing asphalt/asphaltenes in petroleum, crude oil, or any hydrocarbon fraction thereof which comprises adding an effective dispersing amount of an asphalt/asphaltene dispersant to said petroleum, crude oil, or fraction thereof, said dispersant comprising an admixture of polymer A and polymer B ranging from 90 to 10 weight percent polymer A and from 10 to 90 weight percent polymer B, wherein polymer A is an alkyl substituted phenol-formaldehyde liquid resin having a weight average molecular weight ranging from about 1,000 to about 20,000 and an alkyl substituent containing from 4 to 24 carbon atoms, which alkyl substituent may be a linear or branched alkyl group; and polymer B is a hydrophilic/lipophilic vinylic polymer having a structure essentially described as:

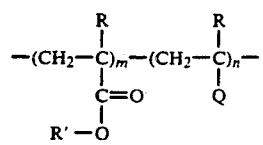

wherein R is chosen at each occurrence, from hydrogen and methyl groups and R' is a hydrocarbonaceous group containing from 4–24 carbon atoms and chosen from linear or branched alkyl groups, aromatic, cyclic, alkaryl, aralkyl groups, and mixtures thereof; and Q is chosen from the groups,

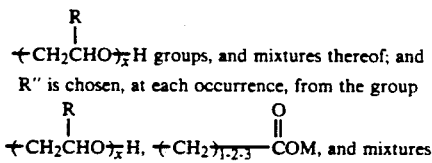

and mixtures thereof; and M is chosen, at each occurrence, from the group hydrogen, alkali metal cations, alkaline earth metal cations, ammonium ions, protonated amines, quaternary amines, hydroxyethyl, hydroxypropyl and

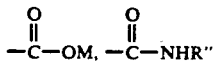 groups, and mixtures thereof; and

R" is chosen, at each occurrence, from the group $+CH_2CHO+_xH$, $+CH_2+_{1-2\cdot3}$—COM, and mixtures thereof; and m and n are both integers of sufficient number to achieve a weight average molecular weight ranging from about 5,000–250,000 and being of such a ratio as to describe the presence of from 90 to 10 weight percent of the lipophilic monomer, m, and from 10 to 90 weight percent of the hydrophilic monomer, n, and wherein x ranges from 1 to 20.

2. The method of claim 1 wherein the effective amount of dispersant ranges between about 1.0 to about 1000 ppm based on the petroleum, crude oil, or hydrocarbon fraction thereof, to which it is added, and the temperature of addition ranges from about 1° C. to about 450° C.

3. The method of claim 1 wherein the asphalt/asphaltene dispersant is within a ratio of A:B between 80:20 to about 20:80.

4. The method of claim 3 wherein R' is chosen from linear and branched alkyl groups containing from 5 to 12 carbon atoms and Q is

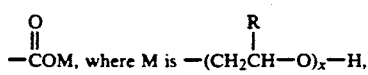

and x is from 1–10.

5. The method of claim 1 wherein the weight ratio of A:B is from 70:30 to 30:70 and the polymer A is a 1:1 mole ratio of nonyl phenol: formaldehyde liquid resin having a molecular weight of from 2,000–8,000 and Polymer B is a copolymer of lauryl acrylate and hydroxyethyl methacrylate containing from 90–10 weight percent lauryl acrylate and from 10–90 weight percent hydroxyethylmethacrylate.

6. The method of claim 1 wherein the asphalt/asphaltene dispersant comprises from 20–90 weight percent of an alkyl substituted phenol-formaldehyde liquid resin having about 1:1 mole ratio of alkyl phenol-formaldehyde ranging between about 1,000 to about 20,000 and wherein the alkyl substituent is a linear or branched alkyl group containing from 5 to 12 carbon atoms; and from 80 to 10 weight percent of a hydrophilic-lipophilic vinylic polymer having a molecular weight between 5,000–250,000 and containing from 90 to 10 weight percent of a fatty (meth) acrylate ester and from 10 to 90 weight percent of a hydrophilic monomer chosen from the group consisting of (meth) acrylic acid, (meth) acrylic acid salts, and (meth) acrylic acid acrylic acid alkoxylate esters.

7. The method of claim 6 wherein the alkyl phenol-formaldehyde liquid resin having a molecular weight of from 2,000 to 12,000 and the hydrophilic-lipophilic vinyl polymer is a copolymer having a molecular weight of from 20,000 to 100,000, and contains lauryl (meth)acrylate and hydroxyethyl (meth)acrylate in a weight ratio of from about 90:10 to about 10:90.

8. The method of claim 7 wherein the nonyl-phenol-formaldehyde resin and the vinyl polymer containing lauryl (meth)acrylate and hydroxyethyl (meth)acrylate are in the weight ratio of from 10:1 to about 1:10, and further, wherein the vinyl polymer contains from 80 to 20 weight percent lauryl (meth)acrylate.

* * * * *